US009930093B2

(12) United States Patent
Exton et al.

(10) Patent No.: US 9,930,093 B2
(45) Date of Patent: Mar. 27, 2018

(54) DYNAMIC WEB SESSION CLEAN-UP (75) Inventors: Scott Anthony Exton, Ormeau Hills (AU); Keiran Robinson, Bonogin (AU); John Sedgmen, Helensvale (AU); Ben Lyle Straubinger, Camp Hill (AU)

(73) Assignee: International Business Machines Corporation, Armonk, NY (US)

( * ) Notice: Subject to any disclaimer, the term of this patent is extended or adjusted under 35 U.S.C. 154(b) by 1220 days.

(21) Appl. No.: 13/420,138

(22) Filed: Mar. 14, 2012

(65) Prior Publication Data
US 2013/0246630 A1 Sep. 19, 2013

(51) Int. Cl.
G06F 15/16 (2006.01)
H04L 29/08 (2006.01)
G06F 17/30 (2006.01)
H04L 29/06 (2006.01)

(52) U.S. Cl.
CPC ........ H04L 67/02 (2013.01); G06F 17/30867 (2013.01); G06F 17/30887 (2013.01); H04L 63/0815 (2013.01); H04L 67/143 (2013.01); H04L 63/0281 (2013.01)

(58) Field of Classification Search
CPC ... H04L 67/143; H04L 67/02; H04L 63/0815; H04L 63/0281; G06F 17/30867; G06F 17/30887
USPC ........................................................ 709/227
See application file for complete search history.

(56) References Cited

U.S. PATENT DOCUMENTS

| 6,226,752 | B1 * | 5/2001 | Gupta | G06F 21/33 |
| | | | | 726/9 |
| 7,493,391 | B2 * | 2/2009 | Hatanaka | 709/225 |
| 7,600,020 | B2 * | 10/2009 | Busch et al. | 709/224 |
| 7,673,045 | B1 * | 3/2010 | Battle | G06F 21/41 |
| | | | | 709/219 |
| 2002/0010776 | A1 * | 1/2002 | Lerner | H04L 63/0815 |
| | | | | 709/225 |
| 2003/0110266 | A1 * | 6/2003 | Rollins et al. | 709/227 |

(Continued)

FOREIGN PATENT DOCUMENTS

WO WO 2007039048 A1 * 4/2007

OTHER PUBLICATIONS

McKinley, "Cleaning Up After Cookies Version 1.0," Dec. 31, 2008.
"How to Perform a Windows IE Cookie Cleanup," 2011.

*Primary Examiner* — Wing F Chan
*Assistant Examiner* — Joseph Maniwang
(74) *Attorney, Agent, or Firm* — Jeffrey S. LaBaw; David H. Judson (57) ABSTRACT

A "sign-off" cookie is generated and stored upon initiation of a web session between a client and a web application executing on a server. The sign-off cookie preferably comprises both an identifier for the session (a "session ID") together with an identifier (such as a URL) for a sign-off resource (associated with a sign-off mechanism) that can be used to clean-up the web session following its termination. The sign-off cookie may be returned to the client and/or retained within a proxy. Upon termination of the web session, the URL in the sign-off cookie is used to initiate a request to the sign-off mechanism to clean-up the web session. This approach provides for dynamic web session clean-up without requiring any pre-configuration of the sign-off mechanism.

23 Claims, 7 Drawing Sheets

(56) References Cited

U.S. PATENT DOCUMENTS

| | | | |
|---|---|---|---|
| 2003/0200465 A1* | 10/2003 | Bhat | H04L 63/0815 726/8 |
| 2003/0212887 A1* | 11/2003 | Walther | H04L 63/08 713/151 |
| 2003/0229783 A1* | 12/2003 | Hardt | G06F 21/33 713/155 |
| 2004/0044772 A1* | 3/2004 | Harkin | H04L 67/14 709/227 |
| 2007/0039043 A1* | 2/2007 | Garskof | 726/8 |
| 2007/0100796 A1* | 5/2007 | Wang | 707/3 |
| 2008/0244719 A1* | 10/2008 | Hariya | G06F 21/41 726/8 |
| 2009/0100438 A1* | 4/2009 | Hinton et al. | 719/311 |
| 2009/0113050 A1* | 4/2009 | Hatanaka | 709/224 |
| 2009/0240564 A1* | 9/2009 | Boerries et al. | 705/10 |
| 2009/0287921 A1* | 11/2009 | Zhu et al. | 713/155 |
| 2012/0209904 A1* | 8/2012 | Huang | 709/203 |

* cited by examiner

*FIG. 4*
*(PRIOR ART)* signoffCookie=%3Cookie%3E%3Cvalue%3Eabc123def456%3c%2Fvalue%3E%3CsignoffResource%3Ehttp%3A%2F%2Fwww
.site.com%2Flogout%3C%2FsignoffResource%3E%3C%2Fcookie%3E Decoded, the cookie looks like this:
signoffCookie= ⟵ 500
<cookie>
  <value>abc123def456</value> ⟵ 504
  <signoffResource>http://www.site.com/logout</signoffResource> ⟵ 506
</cookie>

```
<html>
<head>

<script type="text/javascript"> function sendSignoffRequests()
{
   var xmlKey = "%3CsignoffResource%3E";
   var xmlKeyEnd = "%3C%2FsignoffResource%3E";
   var cookie, cookies = document.cookie.split(";");

while ( cookie = cookies.pop() ) {
      var content = cookie.substr(cookie.indexOf("=")+1);
      var urlBeg = content.indexOf(xmlKey);
      var urlEnd = content.indexOf(xmlKeyEnd);

if ( (urlBeg != -1) && (urlEnd != -1)) {
         var url = content.substring(urlBeg+xmlKey.length, urlEnd);
         sendRequest(decodeURIComponent(url));
      }
   }
} function sendRequest(url)
{
   try {
      cookieRequest = new XMLHttpRequest();
   } catch (trymicrosoft) {
      try {
         cookieRequest = new ActiveXObject("Msxml2.XMLHTTP");
      } catch (othermicrosoft) {
         try {
            cookieRequest = new ActiveXObject("Microsoft.XMLHTTP");
         } catch (failed) {
            cookieRequest = false;
         }
      }
   } if (cookieRequest) {
      cookieRequest.open("GET", url, false);
      cookieRequest.send(null);
      if ( cookieRequest.status != 200 ) {
         alert("Signoff request to "+url+" failed!");
      }
      alert("Response: "+cookieRequest.response);
   }
}

</script>

</head>

<body onload="sendSignoffRequests()">
Test signoff application.
</body>
</html>
```

*FIG. 9*

DYNAMIC WEB SESSION CLEAN-UP

This application includes subject matter that is protected by copyright. All rights are reserved.

BACKGROUND OF THE INVENTION

Technical Field

This disclosure relates generally to web application security and in particular to a method and system for dynamic web session clean-up session using cookies that have been augmented to include sign-off resource URLs.

Background of the Related Art

When clients authenticate with a remote application, a session for that client is created on the web server. These sessions remain active until the client requests their destruction, which typically requires manual user intervention. Typically, there exists no standardized method to clean up sessions on remote servers without a static configuration that can map the session identity (usually contained within an HTTP cookie) to a sign-off resource for the session. HTTP cookies (see IETF RFC 2109) provide a way of managing sessions and state between web browsers and web servers using the HTTP protocol.

It is known in the prior art to associate a session cookie to a sign-off resource via a manually-configured static configuration. One such approach is described in U.S. Publication No. 2007/0039043. A weakness of this approach is the requirement for manual configuration and dependence on a third party application or database to manage the sign-off operations. Further, the described solution is not portable, and it cannot be extended automatically because only a list of statically-configured URLs can be invoked in the sign-off process until a new mapping of cookie-to-sign-off resource is manually added to the configuration.

It is also known in the prior to provide so-called Web portals, which are web-based mechanisms that centralize access to information, applications, and services for employees, customers, or partners. A Web portal delivers a consolidated view that lets users access electronic resources of the organization using a standard technology (a web browser), simply and efficiently. Within a Web portal or like environment, typically a proxy or web server acts as a front-end "point of contact" to a set of back-end applications or application components. In this type of environment, it is desirable that the mechanism used to provide authentication and session management at the web portal layer should also provide these functions for any back-end applications that are included in a consolidated view.

In this type of environment, approaches to session management typically have each back end application or application component requiring its own session state management, and each such application or component may implement its own session management technique. Where an end user is accessing multiple applications within a single enterprise, his or her browser ends up managing independent session management items (often as many as a different item per application). Typically, in this environment, these items are HTTP cookies, as the behavior of such cookies (although not intended for session management) provides reasonable session management.

When an authenticating reverse proxy is used to enable single sign-on (SSO) to multiple backend applications running, for example, on a web server, cookies from the backend applications are typically permitted to flow back to the web browser. When a user logs out of the reverse proxy, however, his or her existing session with the backend server can remain in the web browser's session cache, sometimes called a cookie jar. If a different user then authenticates to the reverse proxy using the same web browser, it is possible that the previous user's sessions in the backend proxied application could be used as opposed to a new session for the new user.

One solution to this problem is to embed script(s) within the logoff page of the reverse proxy to clear any cookies for the proxied applications. One of the drawbacks of this approach is that new scripts have to be added for each proxied application matching all of the cookies for this particular proxied web server. This becomes a manual process for a system administrator. Moreover, depending on the type of proxying method used and how the cookie is stored in the web browser's cookie jar, these cookies may not be able to be deleted easily. This approach can also require modifications to the proxied server's log off page, which can be quite intrusive. Further, this approach does not address the situation where the logoff is not instigated from the browser (e.g., when the user session within a reverse proxy simply times-out).

Other existing solutions include storing cookies within the cookie jar in the proxy but never sending them to the client browser. The cookies are then expired within the cookie jar on logout to provide single sign-off from backend servers. A limitation of this approach, however, is that the cookies are destroyed by the proxy when the session is terminated, but this does not terminate any corresponding sessions in the backend servers. Further, at times cookies are required in the browser for the web application to operate correctly. This approach also is undesirable in that it does not allow cookies to flow back to the web browser during the user session.

BRIEF SUMMARY OF THE INVENTION

According to this disclosure, a "sign-off" cookie is generated and stored upon initiation of a web session between a client and a web application executing on a server. The sign-off cookie preferably comprises both an identifier for the session (a "session ID") together with an identifier (such as a URL) for a sign-off resource (associated with a sign-off mechanism) that can be used to clean-up the web session following its termination. The sign-off cookie may be returned to the client and/or retained within a proxy. Upon termination of the web session, the URL in the sign-off cookie is used to initiate a request to the sign-off mechanism to clean-up the web session. This approach provides for dynamic web session clean-up without requiring any pre-configuration of the sign-off mechanism.

In one particular embodiment, a method is provided for dynamic web session clean-up using a sign-off mechanism. The method begins in response to initiation of any web session between a client browser and a web application by generating a cookie having a particular format. Preferably, the cookie includes both a session identifier, and a URL of a sign-off resource to be used to clean-up the web session upon termination. The cookie is stored in a data store with one or more other cookies that have been generated in connection with one or more other web sessions. Upon receipt at the sign-off mechanism of a request to terminate a web session, a determination is made whether there is cookie in the data store that includes a URL of a sign-off resource. If so, the URL in the cookie is used by the sign-off mechanism to initiate a clean-up request to the sign-off resource.

In an alternative embodiment, the above-described method is performed in a proxy apparatus. The apparatus is positioned between a client browser and one or more backend applications and carries out the method during a session with a user operating the client browser.

In another alternative embodiment, the above-described method is performed by a computer program product in a computer readable medium for use in a data processing system, which system may be positioned between a client browser and one or more backend applications. The computer program product holds computer program instructions which, when executed by the data processing system, perform the method.

The foregoing has outlined some of the more pertinent features of the invention. These features should be construed to be merely illustrative. Many other beneficial results are attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
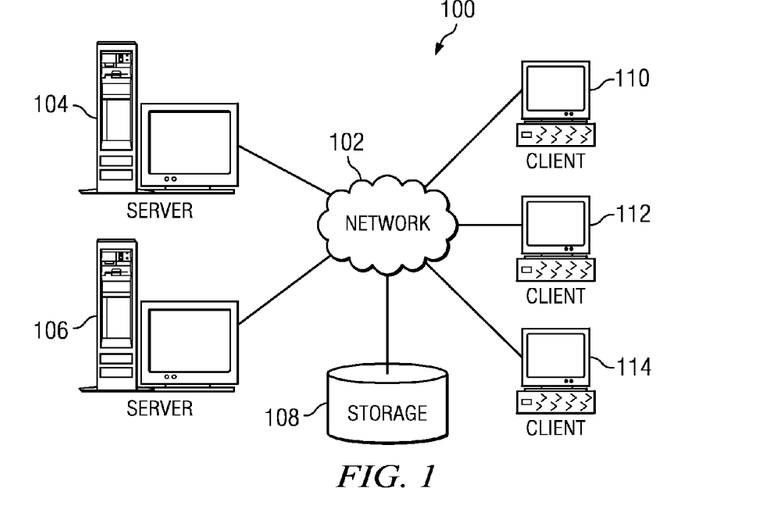
FIG. 1 depicts an exemplary block diagram of a distributed data processing environment in which exemplary aspects of the illustrative embodiments may be implemented.
Figure 2:
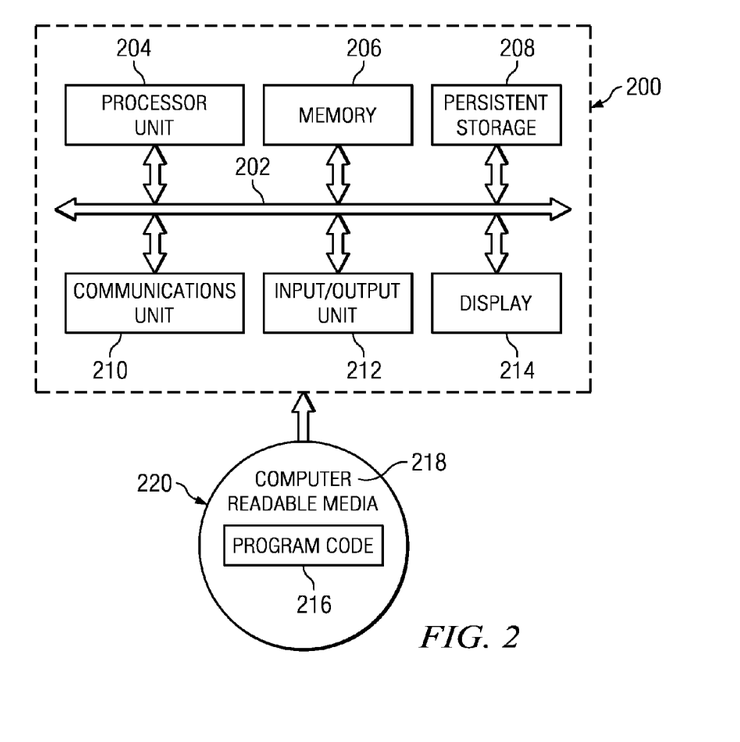
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C or the like, and conventional procedural programming languages, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
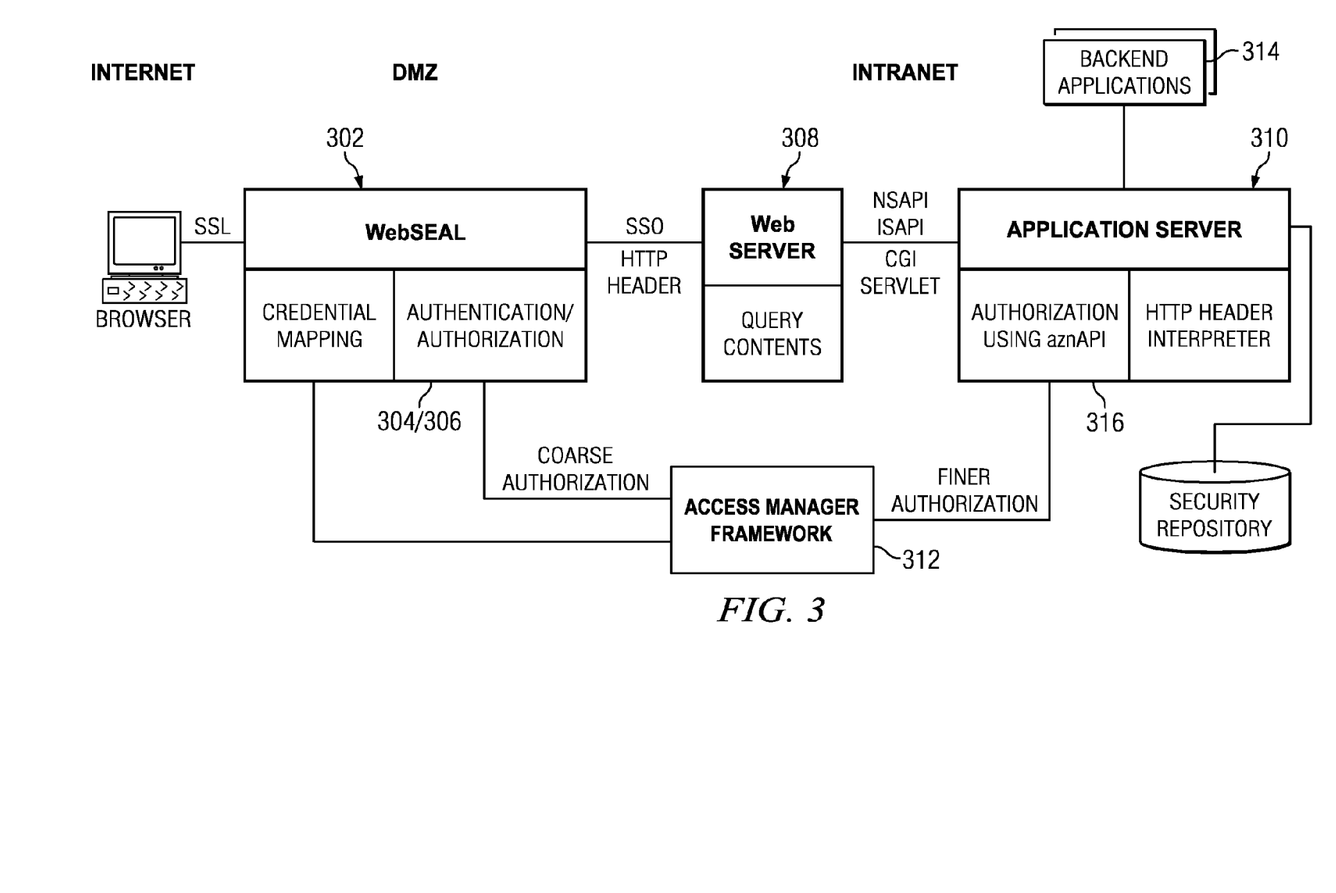
FIG. 3 illustrates a known Web portal having an access management framework in which the subject disclosure may be implemented.

As will also be described, the technique that is the subject of this disclosure also may be implemented in a system that includes a session management component. Session management typically is provided in association with an access manager, which is a component that prevents unauthorized use of resources, including the prevention of use of a given resource in an unauthorized manner. A representative access manager is the Tivoli® Access Manager for e-business (TAMeb) product, which is available commercially from IBM, and is represented in FIG. 3. Of course, the identification of this commercial product is not meant to be taken to limit the present invention. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. As described above, this component is responsible for the session management of users.

FIG. 3 illustrates how TAM is integrated in a Web portal to provide authorization and access control services for Web resources. A high performance, multi-threaded Web server 302 (called WebSEAL in the figure), a TAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

As one of ordinary skill in the art will appreciate, TAM provides a reverse proxy, web plug-in or the like that provides session management functionality and that includes authorization functionality as part of this session management. Authentication is handled by TAM, meaning that TAM collects a user's authentication credentials, evaluates them, and establishes a session, including some form of session management functionality (such as a session cookie). To provide a user with the advantages of this consolidated environment, TAM then provides a single sign-on solution for the user by asserting authentication credentials (such as username/password) to the back-end applications. This allows the back-end application to be added to the portal environment without modification.

Figure 4:
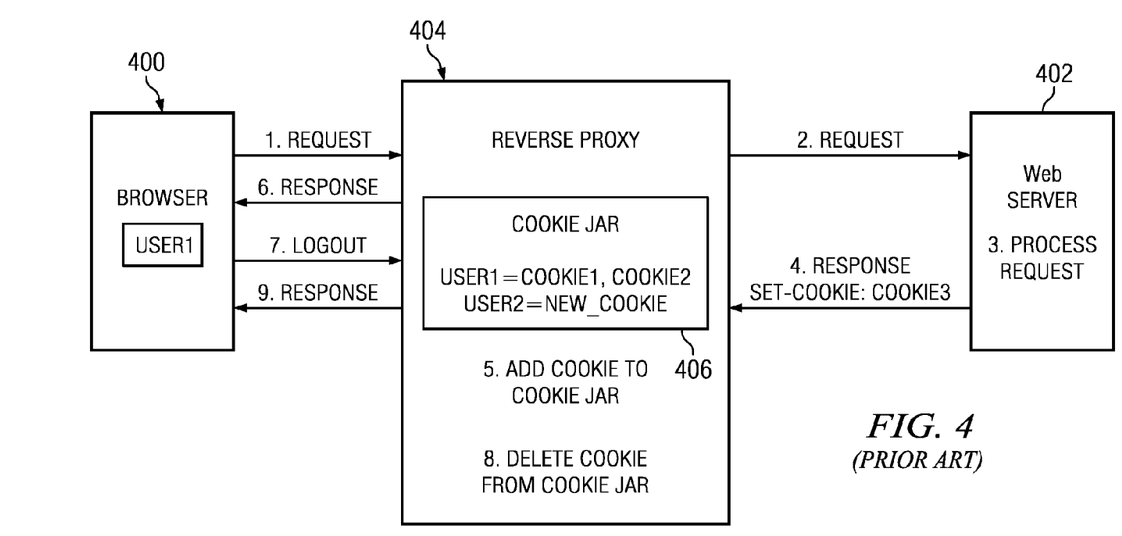
FIG. 4 is a simplified block diagram of a web browser interacting with a backend application through a reverse proxy that stores cookies in a session cache or "cookie jar" as is known in the prior art.

FIG. 4 is a simplified block diagram showing an example information flow for session management in a proxy environment, such as shown in FIG. 3. In this example, a first user (User1) of web browser 400 has established an existing authentication session with backend web server 402 using the reverse proxy 404, such as TAM. The proxy includes a session cache 406 (or "cookie jar") that is instantiated on a per-user session basis. In step (1), the first user uses the web browser 400 to make an HTTP request to the web server 402 via the reverse proxy 404. The reverse proxy 404 receives the request and, at step (2), passes it to the web server 402. The web server 402 process the request at step (3). At step (4), the web server 402 returns a response to the reverse proxy 404 containing a Set-Cookie HTTP header. At step (5), the reverse proxy 404 detects the Set-Cookie header and adds the cookie to its cookie jar 406 for the authenticated user (in this case, user1). At step (6), the reverse proxy sends the response back to the web browser 400 but removes the 'Set-Cookie' header. Thus, in this prior art approach, typically the cookie is not returned to the web browser. Thereafter, assume that the first user then uses the browser to log out of the session it has with the reverse proxy 404. This is step (7). At step (8), the reverse proxy 404 accesses the cookie jar to determine whether to delete any cookies. At step (9), the reverse proxy 404 returns a logout response to the browser. The reverse proxy then completes other session cleanup activities.

Dynamic Web Session Clean-Up

According to this disclosure, a cookie (such as an HTTP session cookie) is extended to include an identifier of a sign-off resource that may be used to clean-up a web session. Typically, the identifier is a Uniform Resource Locator (URL) or other data string that is placed within a cookie that also includes a session identifier (a session ID) uniquely associated with the web session. As is well-known, an HTTP cookie typically comprises a set of name-value pairs. According to this disclosure, one of these name-value pairs comprises a name (e.g., "signoffCookie") and a value, which is typically the URL of the sign-off resource. A cookie of this type is sometimes referred to herein as a "sign-off cookie," although this nomenclature is provided for descriptive purposes only. The URL may be associated with one or more sign-off resources or, more generally, to a sign-off mechanism. As used herein, a "sign-off resource" should be broadly construed to refer to any system, device, appliance, program, process, thread, or the like, including any associated data, adapted to be returned to a particular state upon termination of a web session.

Figure 5:
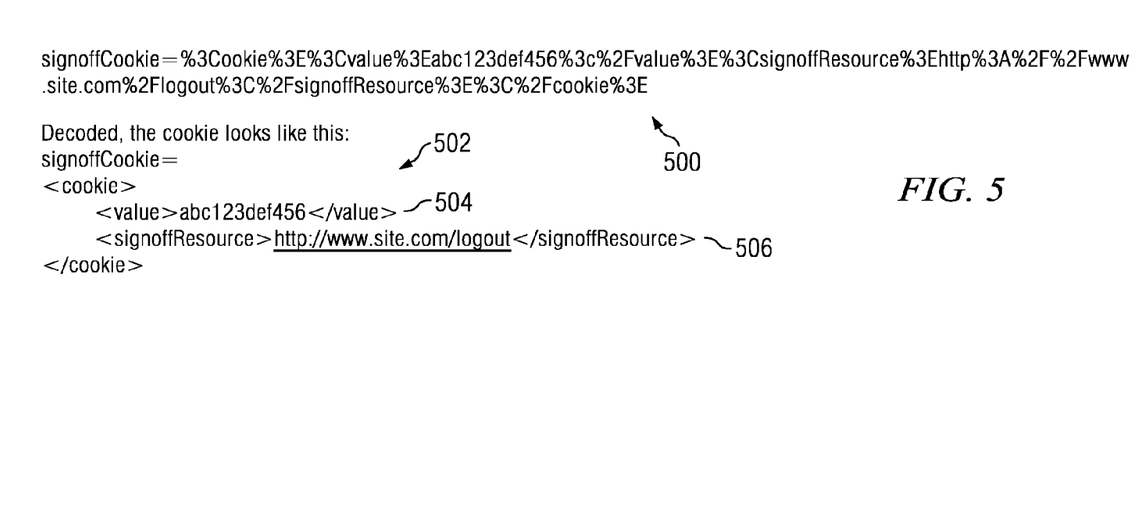
FIG. 5 illustrates a representative sign-off cookie generated by a server application according to this disclosure, and an XML-based representation of this cookie.

FIG. 5 illustrates a representative sign-off cookie 500. In this example, the sign-off resource URL is stored in the value field of the cookie. An example implementation uses a URI-encoded XML to encapsulate a session identifier and the sign-off resource URL. Decoded, the cookie has the XML format 502. This XML representation illustrates the session identifier 504 and the sign-off resource URL 506. This encoding is provided merely as an example; any cookie format compatible with IETF RFC 2109 (or other Internet standards) may be used. It is not required that an encoding be used. Thus, in an alternative embodiment, the cookie is a data structure that includes first and second name-value pairs in a plaintext form, with the first name-value pair defining the session identifier, and the second name-value pair defining the sign-off resource locator. The sign-off resource locator may, in another variation, be a token that references the URL of the sign-off resource, in which case a token-to-URI mapping may be used. The information in the sign-off cookie may be secured, for example, using an encryption layer (or wrapping), and one or more other name-value pairs (or other information) may be associated therewith. In a preferred embodiment, the sign-off cookie consists of just the session ID and the sign-off resource URL, such as shown in FIG. 5.

Figure 6:
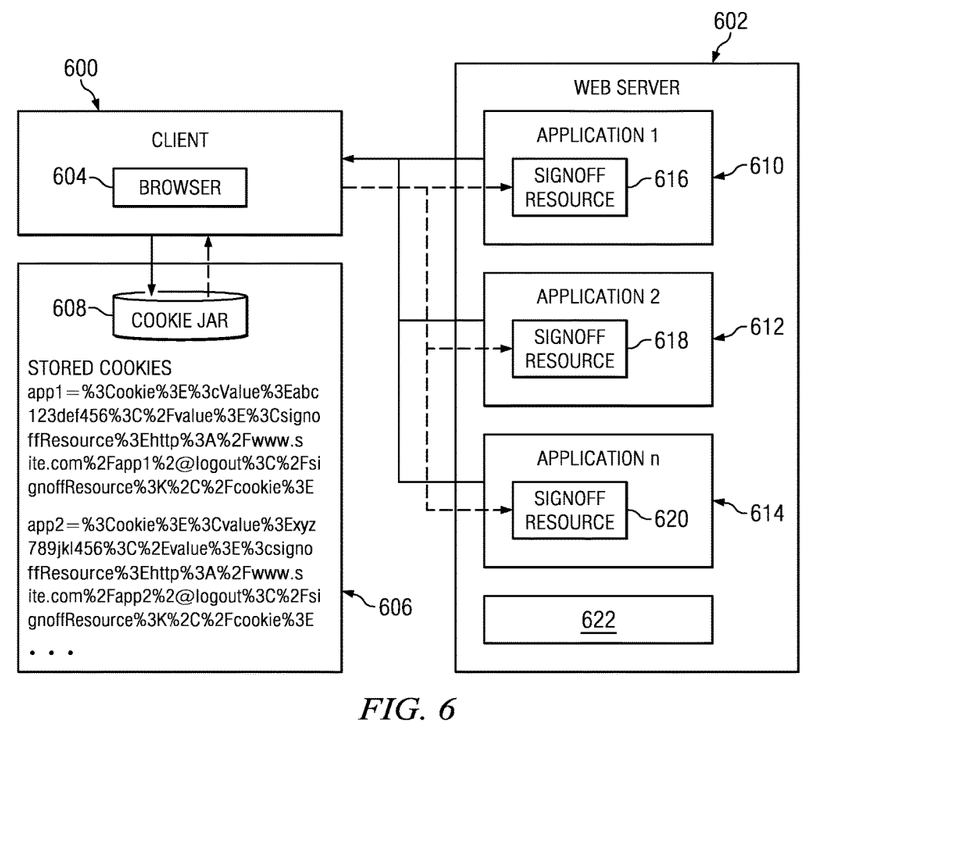
FIG. 6 illustrates a block diagram of a client web browser interacting with a plurality of server-based web applications in a first embodiment of this disclosure.

FIG. 6 illustrates a block diagram of a client web browser interacting with a plurality of server applications in a first embodiment of this disclosure. In this embodiment, there is no intermediary, such as a web proxy or Web portal. Here, client 600 interacts with web server 602 over a network (not shown), such as the public Internet, a private network, or the like. Each of the client 600 and server 602 may be implemented as a data processing system, such as illustrated in FIG. 2. Typically, communications between the client and the server are secure (e.g., via SSL). The client 600 typically has a browser or other rendering engine 604, and a data store 606 associated therewith. The data store 606 includes a cookie jar 608 in which server-side cookies are maintained in a known manner. The cookie jar 608 may be a dedicated cache, or any memory or persistent storage. The web server 602 typically executes one or more applications, such as application 610, 612 or 614. The applications typically are accessible over the Web at a given service provider domain or sub-domain. As the client 600 makes requests and authenticates with a web application 610, 612 or 614, the web application generates a cookie and provides the cookie to the client, which then stores the cookie in the cookie jar 608. The solid line(s) indicate the client receiving the cookies from the responses generated by the applications. According to this disclosure as has been described, a cookie generated by a web application has the special format of both the session ID and the sign-off resource URL. In particular, each application typically has associated therewith a sign-off resource. Thus, application 610 has an associated sign-off resource 616, application 612 has an associated sign-off resource 618, and application 614 has an associated sign-off resource 620. One or more of the sign-off resources may be consolidated or shared. Each cookie generated by the web application includes the sign-off resource URL for the particular sign-off resource that is to be used to facilitate the clean-up of the session. Thus, preferably the cookie generated by application 610 includes the sign-off resource URL for sign-off resource 616, the cookie generated by application 612 includes the sign-off resource URL for sign-off resource 618, and the cookie generated by application 614 includes the sign-off resource URL for sign-off resource 620 application.

The server may also include a sign-off mechanism 622, which directs individual sign-off requests to the one or more sign-off resources 616, 618 and 620. In such case, the sign-off resource URL in a particular cookie may point to the sign-off mechanism itself instead of the sign-off resource.

In an alternative embodiment, a cookie may include one or more sign-off resource locators.

When a session is terminated, such as when an end user closes the browser or otherwise attempts to logoff from the web application, the client inspects the cookies in the cookie jar 608. In this embodiment, the client browser or code associated therewith (e.g., a plug-in, an Active X control, or the like) is augmented to perform this inspection function. For each sign-off cookie found, the browser or code associated therewith generates a request to the URL identified in the cookie. The request is sent to the sign-off resource identified by the URL, and this request initiates or implements the clean-up of the session. This operation is indicated by the dashed line. Preferably, the request includes the session cookie itself, although this is not required. When the sign-off resource receives the request from the client browser, the session within the web application is destroyed and cleaned-up.

While in the above-described embodiment the client (typically, the client browser) is augmented to include the functions of searching the cookie jar to locate sign-off cookies and sending the clean-up requests, this is not a requirement. The functionality may be implemented without changes to the client or client browser. In an alternative embodiment, the functionality is implemented within a script embedded in a logoff (or other page) served by the web application. In this approach, when the web browser is about to close or navigate away from the page, a script embedded in the page examines the cookie jar for cookies containing the session ID and sign-off resource URL. If any such cookies are located, the script then issues a request to the sign-off resource for each cookie.

Figure 7:
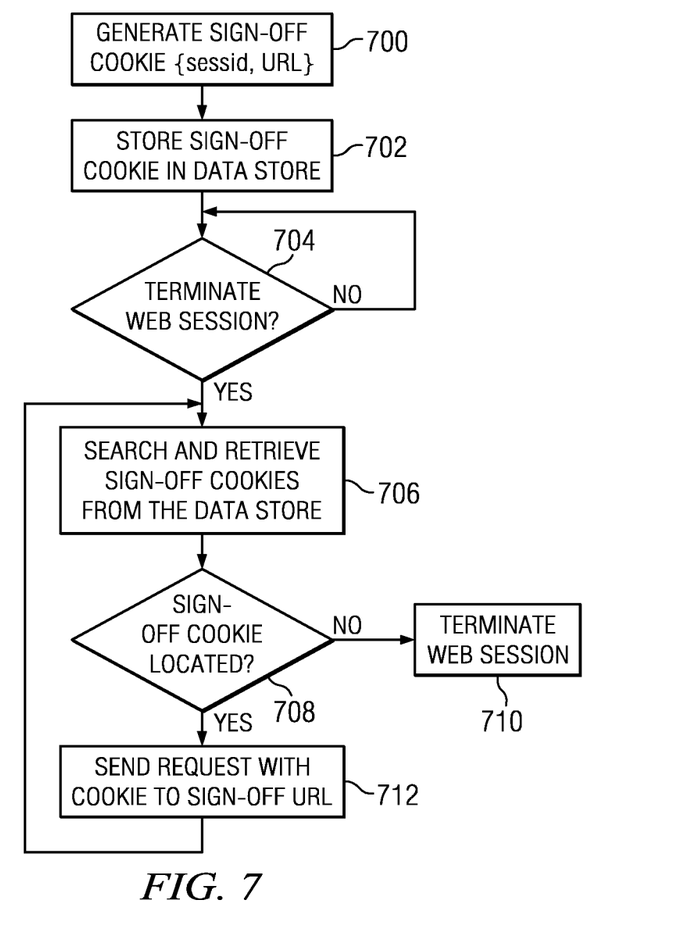
FIG. 7 illustrates a process flow illustrating the basic sign-off and dynamic web session clean-up operation of this disclosure.

FIG. 7 is a process flow illustrating the dynamic web session clean-up operation of this disclosure. The routine begins upon creation of a web session. Thus, at step 700, a sign-off cookie including the session identifier and the sign-off resource URL is generated. Typically, the sign-off cookie is generated upon a successful authentication. Typically, the web application generates the cookie, although this function may be carried out by a process, program or thread dedicated to this function. At step 702, the cookie is saved in a data store. In the embodiment of FIG. 7, the data store is the client-side cookie jar, although this is not a limitation, as the cookie may be saved on the server, or in an intermediary such as a Web portal (as described below in my detail). At step 704, a test is performed to determine whether a web session is to be terminated. Typically, step 704 tests for receipt of a logoff request, which may occur directly (via an explicit request) or indirectly (such as when a browser is closed during an existing session). If the result of the test at step 704 is negative, the routine cycles and waits. If, however, the result of the test at step 704 indicates that a web session is to be terminated, the routine continues at step 706 to examine the data store. At step 708, a test is performed to determine whether a sign-off cookie has been located. If so, the routine continues to generate a request to the sign-off resource identified by the URL. Thus, at step 712, a request containing the cookie is sent to that URL, thereby cleaning-up the session, and the cookie is removed from the cookies in the data store. The routine then returns to step 706 to look for additional sign-off cookies (until no more cookies are found). Thus, when the result of the test at step 708 is negative, the routine branches to step 710, and the web session is terminated in the usual manner. As can be seen, step 712 is repeated for each sign-off cookie located if the client is logging off from all web sessions (e.g., which occurs when the browser is closed). It is not required, however, that closure and clean-up of a particular web session terminates other web sessions.

Thus, FIG. 6 as described above illustrates an example implementation where the client is responsible for the sign-off process. In that scenario, as has been described, the client is capable of identifying the sign-off cookie type. As the client makes requests and authenticates with web applications, the client stores the cookies from the responses generated by the applications in its cookie jar. When the client is performing the session clean-up, it inspects all cookies in the cookie jar. For all cookies found that conform to the sign-off cookie structure, a request containing that cookie is sent to that URL, cleaning up the session. Sending each session cookie to the appropriate sign-off resource destroys that session within the application, achieving single sign-off, and allowing the application to clean up the user session.

Figure 8:
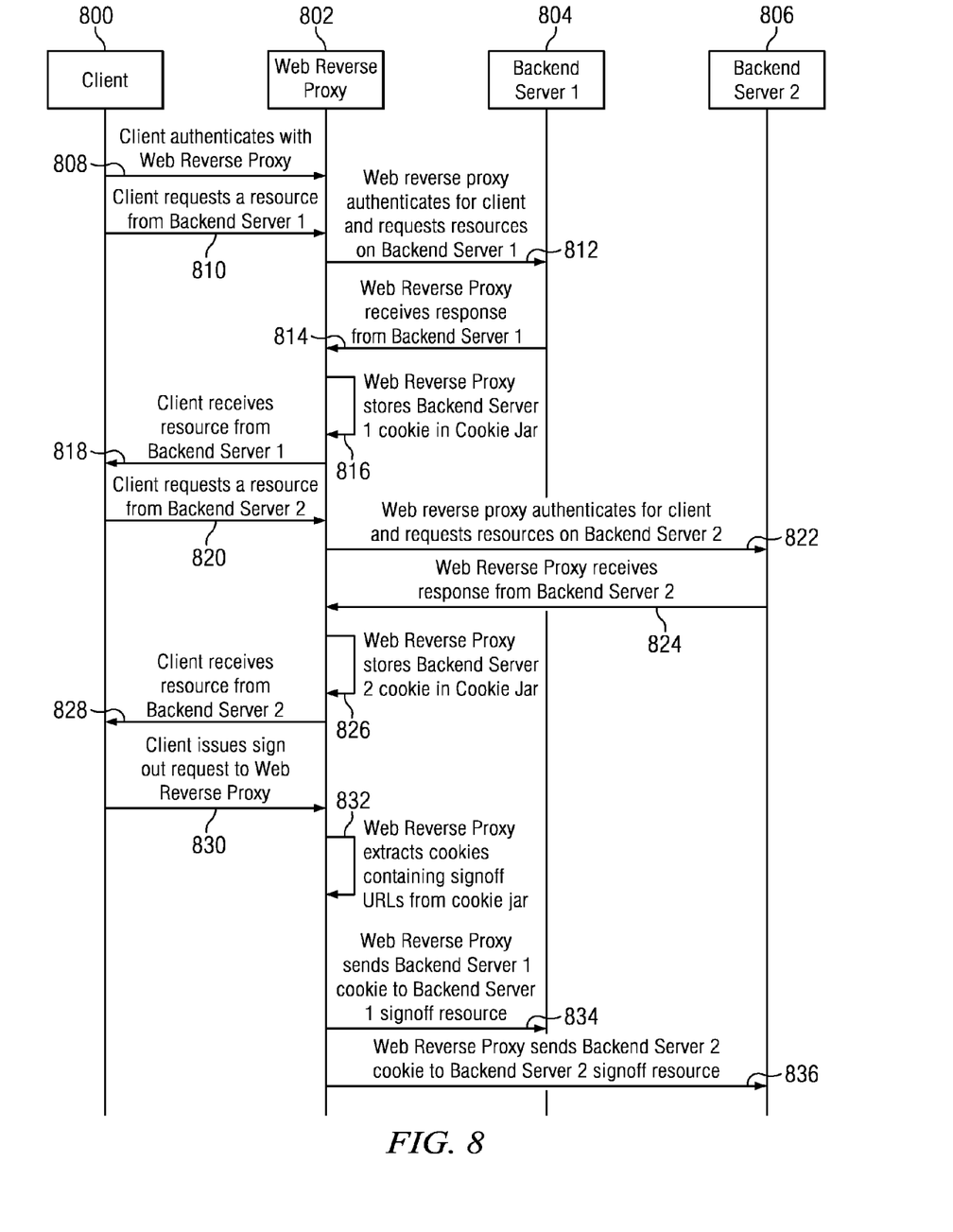
FIG. 8 is a UML diagram illustrating an alternative embodiment of this disclosure wherein a proxy implements the sign-off cookie handling functionality.

An alternative embodiment implements the disclosed subject matter in a Web reverse proxy or Web portal, such as described above in FIG. 3. In this variant, the web application instances generate the sign-off cookies, which are then saved in a cookie jar associated with the proxy. An embodiment of this type was described above in FIG. 4. The proxy may also include a sign-off mechanism. FIG. 8 illustrates a UML sequence diagram illustrating how a proxy of this type achieves single sign-off in this manner. In this example, client 800 interacts with web reverse proxy 802 having backend server application 804, and backend server application 806 associated therewith. Steps 808, 810, 812 and 814 illustrate the client authenticating to the proxy, and the proxy authenticating to the backend server application 804. Response 814 includes the sign-off cookie. At step 816, the proxy stores the cookie in the cookie jar. At step 818, the proxy returns a response to the client, and that response may or may not include the cookie. Steps 820, 822 and 824 illustrate the client requesting a resource from backend server application 806. The server application 806 generates the sign-off cookie and provides it to the proxy in step 824. The proxy then stores the sign-off cookie in the cookie jar at step 826. Proxy 802 returns a response to the client 800 at step 828. Now, assume the browser issues a sign-out request (e.g., by closing the browser). This is step 830. At step 832, the proxy searches the cookie jar and extracts cookies that contain the sign-off resource locators. At steps 834 and 836, the proxy uses those URLs to request sign-off and clean-up at the respective sign-off resources.

Figure 9:
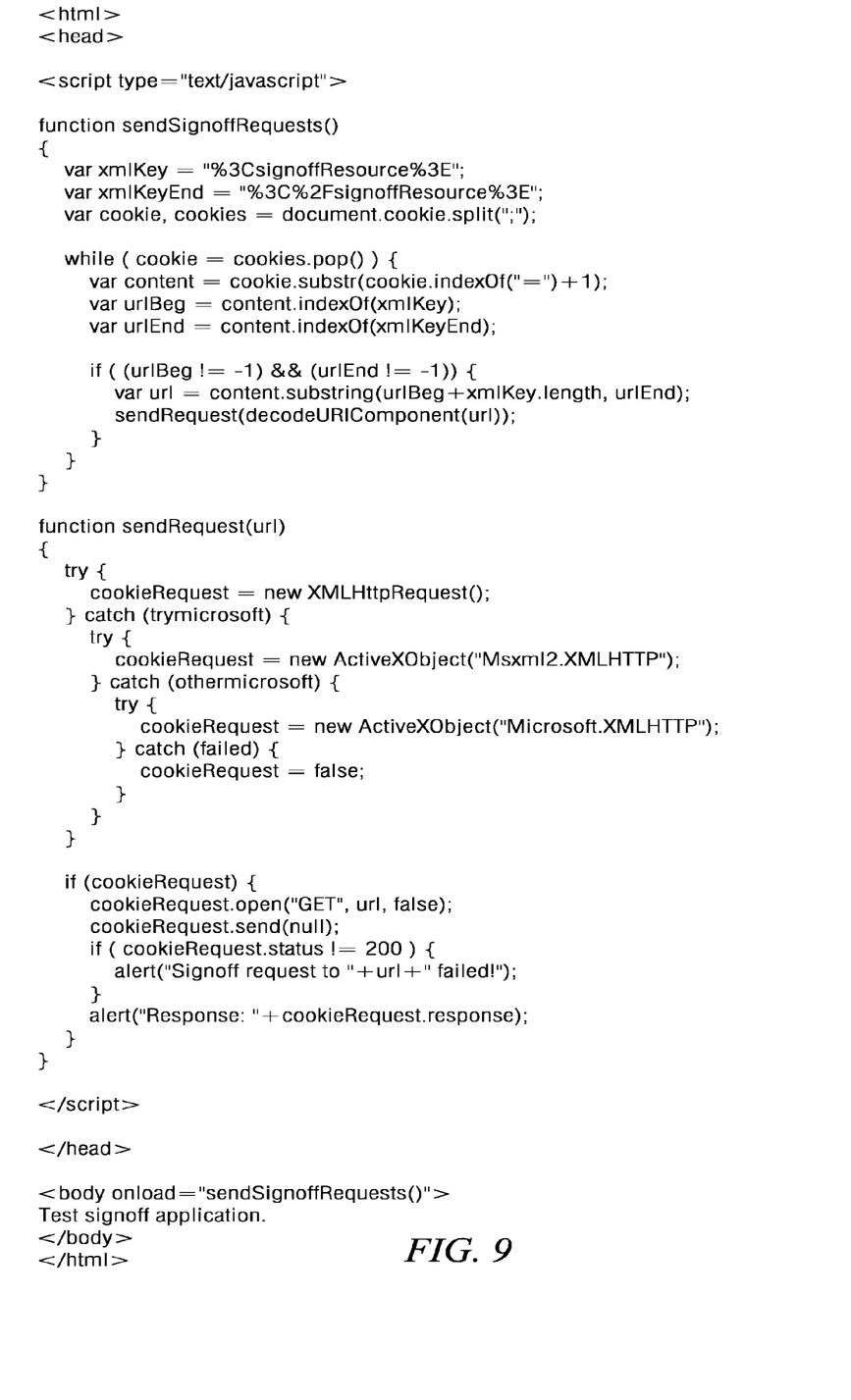
FIG. 9 is a representative script-based implementation of the sign-off cookie handling functionality.

FIG. 9 illustrates a representative script that implements the sign-off function in a client-side embodiment.

The described technique provides significant advantages. No pre-configuration of cookie names and sign-off URLs are required. No additional cookies or tracking mechanisms are required. Accordingly, new sites or domains can be added dynamically to the single sign-off capability. Because the web applications generate session cookies that contain both the session ID and the URL of the sign-off resource, there is no need to pre-configure sign-off resource URLs. Because this information is supplied (by the client or the proxy, as the case may be) dynamically, sign-off systems require no pre-configuration and are not limited to a single set of defined websites for which they can perform sign-off operations. This is especially useful for organizations that do not have direct control over client code and cannot change such code when new applications are introduced. Moreover, the approach can be implemented on the client-side with a script that executes in a logoff page.

By defining a sign-off resource within the session cookie itself, the disclosed technique enables the sign-off operation to be achieved more efficiently and in a manner that does not require manual- or pre-configuration. As has been described, the solution removes the need for static configuration of any type or at any point in time, as preferably the sign-off resource is embedded in the session cookie. As a consequence, any system performing the actual sign-off need not be pre-configured either.

The functionality described above may be implemented as a standalone approach, e.g., a software-based function executed by a processor, or portions of it (such as the cookie generation, cookie jar checking, or sign-off request processing) may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The proxy may be located in a domain that differs from the domain of one or more back-end applications and, thus, the techniques herein may be practiced in a loosely-coupled server (including a "cloud"-based) environment. The proxy itself may be hosted in the cloud, in which case it can provide single sign-on to applications running in a third party environment as well as the single sign-off functionality described herein.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the managed cookie functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the cookie generating, storing and processing components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises a dynamic web session clean-up framework that provides single sign-off in a client or proxy, as has been described above.

The sign-off cookie function may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The techniques disclosed herein are not limited to a Web-based portal having a point of contact that provides authentication, session management and authorization, but this will be a typical implementation. As noted, the above-described function may be used in any system, device, portal, site, or the like wherein server-set session management data might be re-used (either by an original user in a different session, or by another user) through the same client browser. More generally, the described technique is designed for use in any operating environment wherein given information (including, without limitation, session management data) is not intended to persist across applications or sessions but ends up doing so because of patterns of client re-use and/or application-level granularity of session information.

The term "cookie" should be broadly construed to refer to an HTTP cookie (RFC 2109) or, more generally, any data structure that includes session-specific data associated with the server-side instance that returns that data structure.

In the client-side embodiment, the cookie jar search and retrieval/sign-off request functionality may be implemented using AJAX or other client-side technologies.

Having described our invention, what we now claim is as follows:

1. A method for dynamic web session clean-up, the method comprising:
    storing a cookie in a data store, the cookie having been generated in response to initiation of a web session between a client and an application, the cookie including a Uniform Resource Locator (URL) of a sign-off resource to be used to clean-up the web session upon termination of the web session;
    responsive to receipt of a request to terminate a web session, determining whether any cookie in the data store includes a URL for a sign-off resource; and
    for any cookie that includes a URL for a sign-off resource, initiating a clean-up request to the sign-off resource identified by the URL in the cookie.

2. The method as described in claim 1 wherein the cookie also includes a session identifier.

3. The method as described in claim 1 wherein the cookie including the session identifier and the URL of the sign-off resource is generated by the application.

4. The method as described in claim 1 further including providing the cookie to the client.

5. The method as described in claim 1 wherein the cookie is stored in a cache associated with one of: the client, and a proxy.

6. The method as described in claim 1 wherein the URL of the sign-off resource is stored in a value field of the cookie.

7. The method as described in claim 1 wherein the method further includes URI-encoding into XML a session identifier for the web session and the URL.

8. The method as described in claim 1 wherein the clean-up request also includes the cookie.

9. An apparatus, comprising:
   a processor;
   a data store;
   computer memory holding computer program instructions that when executed by the processor perform a method for dynamic web session clean-up, the method comprising:
      storing a cookie in the data store, the cookie having been generated in response to initiation of a web session between a client and an application, the cookie including a Uniform Resource Locator (URL) of a sign-off resource to be used to clean-up the web session upon termination of the web session;
      responsive to receipt of a request to terminate a web session, determining whether any cookie in the data store includes a URL for a sign-off resource; and
      for any cookie that includes a URL for a sign-off resource, initiating a clean-up request to the sign-off resource identified by the URL in the cookie.

10. The apparatus as described in claim 9 wherein the cookie also includes a session identifier.

11. The apparatus as described in claim 10 wherein the cookie including the session identifier and the URL of the sign-off resource is generated by the application.

12. The apparatus as described in claim 10 wherein the method further includes providing the cookie to the client.

13. The apparatus as described in claim 9 wherein the URL of the sign-off resource is stored in a value field of the cookie.

14. The apparatus as described in claim 9 wherein the method further includes URI-encoding into XML a session identifier for the web session and the URL.

15. The apparatus as described in claim 9 wherein the clean-up request also includes the cookie.

16. A computer program product in a non-transitory computer readable storage medium for use in a data processing system, the computer program product holding computer program instructions which, when executed by the data processing system, perform a method comprising:
   storing a cookie in a data store, the cookie having been generated in response to initiation of a web session between a client and an application, the cookie including a Uniform Resource Locator (URL) of a sign-off resource to be used to clean-up the web session upon termination of the web session;
   responsive to a request to terminate a web session, determining whether any cookie in the data store includes a URL for a sign-off resource; and
   for any cookie that includes a URL for a sign-off resource, initiating a clean-up request to the sent to the sign-off resource identified by the URL in the cookie.

17. The computer program product as described in claim 16 wherein the determining and initiating steps are implemented in a client script.

18. The apparatus as described in claim 17 wherein the clean-up request also includes the cookie.

19. The computer program product as described in claim 16 wherein the cookie also includes a session identifier.

20. The computer program product as described in claim 19 wherein the cookie including the session identifier and the URL of the sign-off resource is generated by the application.

21. The computer program product as described in claim 16 wherein the cookie is stored in a cache associated with one of: the client, and a proxy.

22. The computer program product as described in claim 16 wherein the URL of the sign-off resource is stored in a value field of the cookie.

23. The computer program product as described in claim 16 wherein the method further includes URI-encoding into XML a session identifier for the web session and a URL.

* * * * *